United States Patent [19]

Yestrebi

[11] 4,121,834
[45] Oct. 24, 1978

[54] PICK-UP DEVICE FOR A PHONOGRAPH TONE ARM

[76] Inventor: Ron B. Yestrebi, 19½ Main St., Webster, N.Y. 14580

[21] Appl. No.: 849,774

[22] Filed: Nov. 9, 1977

[51] Int. Cl.² ............................................. G11B 17/06
[52] U.S. Cl. ................................. 274/1 R; 274/23 R
[58] Field of Search .................. 274/1 R, 23 R, 23 A

[56] References Cited

U.S. PATENT DOCUMENTS

| | | | |
|---|---|---|---|
| 2,869,877 | 1/1959 | Bard | 274/23 A |
| 3,219,351 | 11/1965 | Shaper et al. | 274/23 R |
| 3,503,615 | 3/1970 | Matsuda | 274/1 R |
| 4,062,548 | 12/1977 | Kagata | 274/23 R |

*Primary Examiner*—Steven L. Stephan
*Attorney, Agent, or Firm*—Fred L. Denson

[57] ABSTRACT

A device for automatically lifting a phonograph stylus from a record after the end of the sound groove has been played includes a pedestal base mounted on a support plate adjacent the turntable and provided with a cavity adapted to receive one end of a boom arm, the free end of which extends to a position over the record run-out groove. The vertical distance between the free end of the boom arm and the record can be adjusted by means of a setscrew. After the stylus has passed the end of the sound groove and entered the run-out groove, a small, thin metal disk located on the top surface of the stylus cartridge receiving shell is attracted to a magnet mounted on the lower surface of the free end of the boom arm and lifts the stylus off of the record.

3 Claims, 4 Drawing Figures

PICK-UP DEVICE FOR A PHONOGRAPH TONE ARM

BACKGROUND OF THE INVENTION

1. Field of the Invention

The present invention relates generally to phonographs and more particularly, to a new and improved device for lifting the tone arm and stylus from a phonograph record after the end of the sound groove has been played.

2. Description of the Prior Art

Conventional high fidelity phonographic equipment is usually not provided with an automatic mechanism to lift the stylus from the phonograph record after the end of the sound groove has been played. As a result, the equipment operator must be on the alert to manually lift the tone arm off of the record as soon as the stylus reaches the end of the sound groove. Failure to remove the stylus from the record at this time results in a continuous rotation of the stylus in the final groove producing an offending repetitious noise and needless stylus wear.

A device for automatically lifting a phonograph stylus from a record at the conclusion of play which is designed for use with high fidelity phonographic equipment is disclosed in U.S. Pat. No. 3,219,351 to Shaper et al. This device consists of a magnet disposed within a shielded housing in such a position that a pin mounted to the tone arm and constructed of a magnetic material will, upon entering the housing through an opening therein, be subjected to a substantially vertical pull that lifts the stylus from the record. While such a device performs satisfactorily, it has the disadvantage of requiring structure, such as the housing and its mounting mechanism, which cannot be manufactured and assembled inexpensively. Moreover, accurate adjustment of the pin is somewhat difficult since small changes in its position are magnified at the stylus due to the length of the tone arm.

SUMMARY OF THE INVENTION

Accordingly, it is an object of the present invention to provide an improved device for automatically lifting a phonograph stylus from a record at the conclusion of play that is inexpensive to manufacture and assemble and yet thoroughly efficient and reliable in operation.

This and other objects and advantages of the present invention are achieved by a device that includes a boom arm, a permanent magnet and a metal disk. One end of the boom arm is adjustably mounted to a support base located adjacent the phonograph turntable. The other end of the boom arm has the magnet mounted to its lower surface and is positioned so that when the stylus completes the play of the record's sound groove, the magnet attracts the metal disk which is mounted to the stylus cartridge and lifts the stylus off of the record.

The invention, and its objects and advantages will become apparent by referring to the accompanying drawings wherein like reference numerals denote like parts and the ensuing detailed description of the preferred embodiments.

DETAILED DESCRIPTION OF THE PREFERRED EMBODIMENTS

Because phonographic apparatus is well known, this description will be directed in particular to elements forming part of, or cooperating more directly with, the present invention. It is to be understood that elements not specifically shown or described herein can be selected from those known in the art.

Figure 1:
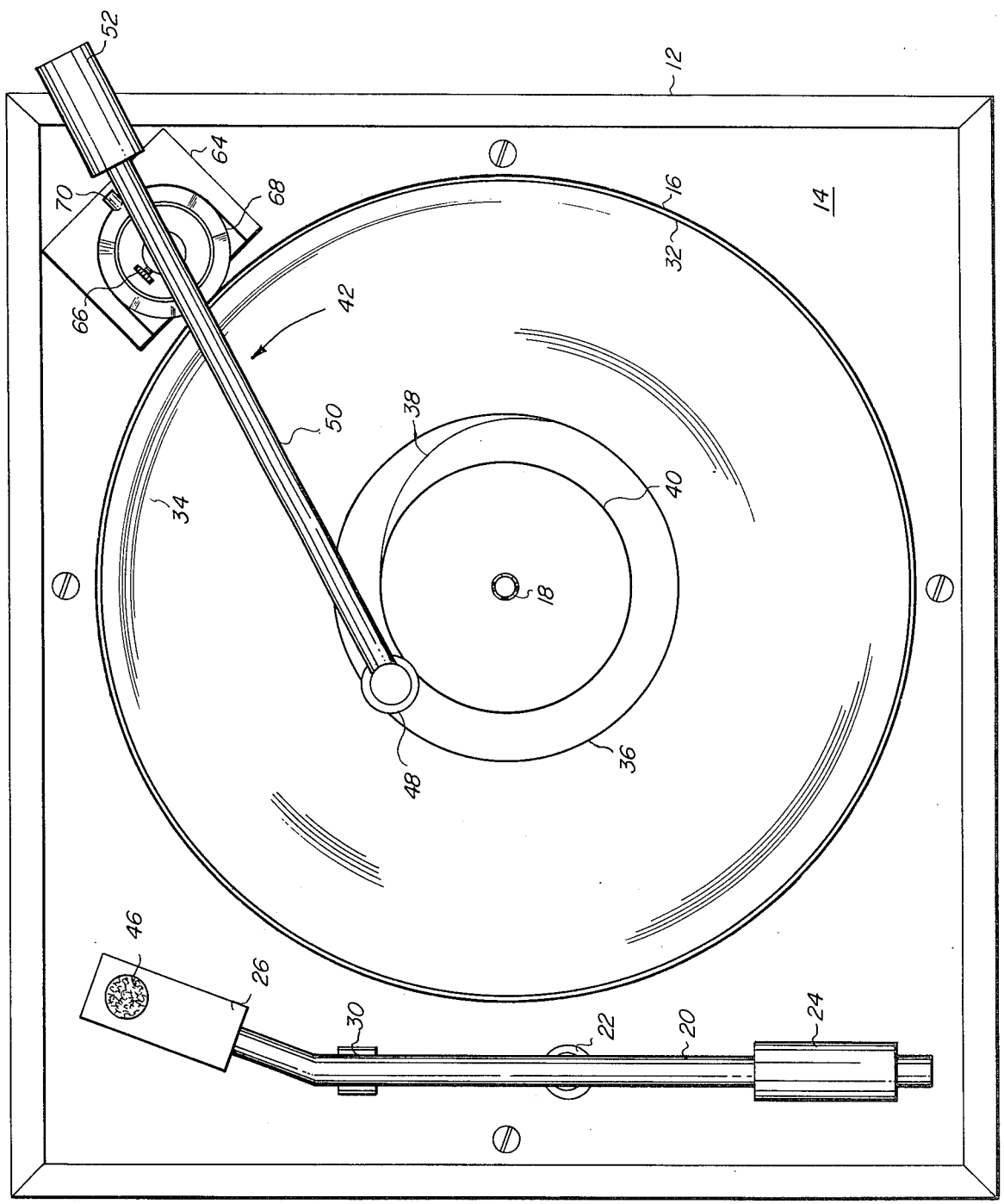
FIG. 1 is a plan view of a phonograph including a stylus lifting device constructed in accordance with the teachings of the present invention.

Referring now to the drawings, and in particular to FIG. 1, a phonograph 10 includes a rectangular base 12 having a mounting board 14 forming the top thereof. A turntable 16, mounted to the board 14 for rotation about a spindle 18, is driven through a suitable drive mechanism (not shown) known in the art. A tone arm 20 is mounted to an assembly 22 for pivotal movement about both a vertical and a horizontal axis. The portion of the tone arm 20 to the rear of the assembly 22 is provided with a counterweight 24 while the portion of the tone arm in front of the assembly is provided with a removable shell 26 within which a phonograph pick-up cartridge including a stylus 28 is mounted. A tone arm rest 30 is mounted to the mounting board 14 and serves to store the tone arm 20 when a record is not being played.

A conventional phonograph record 32 is provided with a continuously spiraling sound groove 34 in the region between the outer peripheral edge of the record and the end portion 36 of the sound groove. The end of the sound groove 36 is connected by one or more spiraling run-out grooves 38 to a final circular closed groove 40 located in the vicinity of the center of the record.

Since the distance between the end of the sound groove 36 and the center of the record 32 conforms to an industry standard, the phonograph 10 is provided with a device 42 made in accordance with the teachings of the present invention that is mounted directly on the mounting board 14 adjacent the turntable 16 and positioned so that a permanent magnet 44 attracts a metal disk 46 mounted to the tone arm cartridge receiving shell 26 thereby lifting the stylus 28 off the record 32 after the end of the sound groove 36 has been played. Metal disk 46 can be made of any magnetically attractive material.

Figure 2:
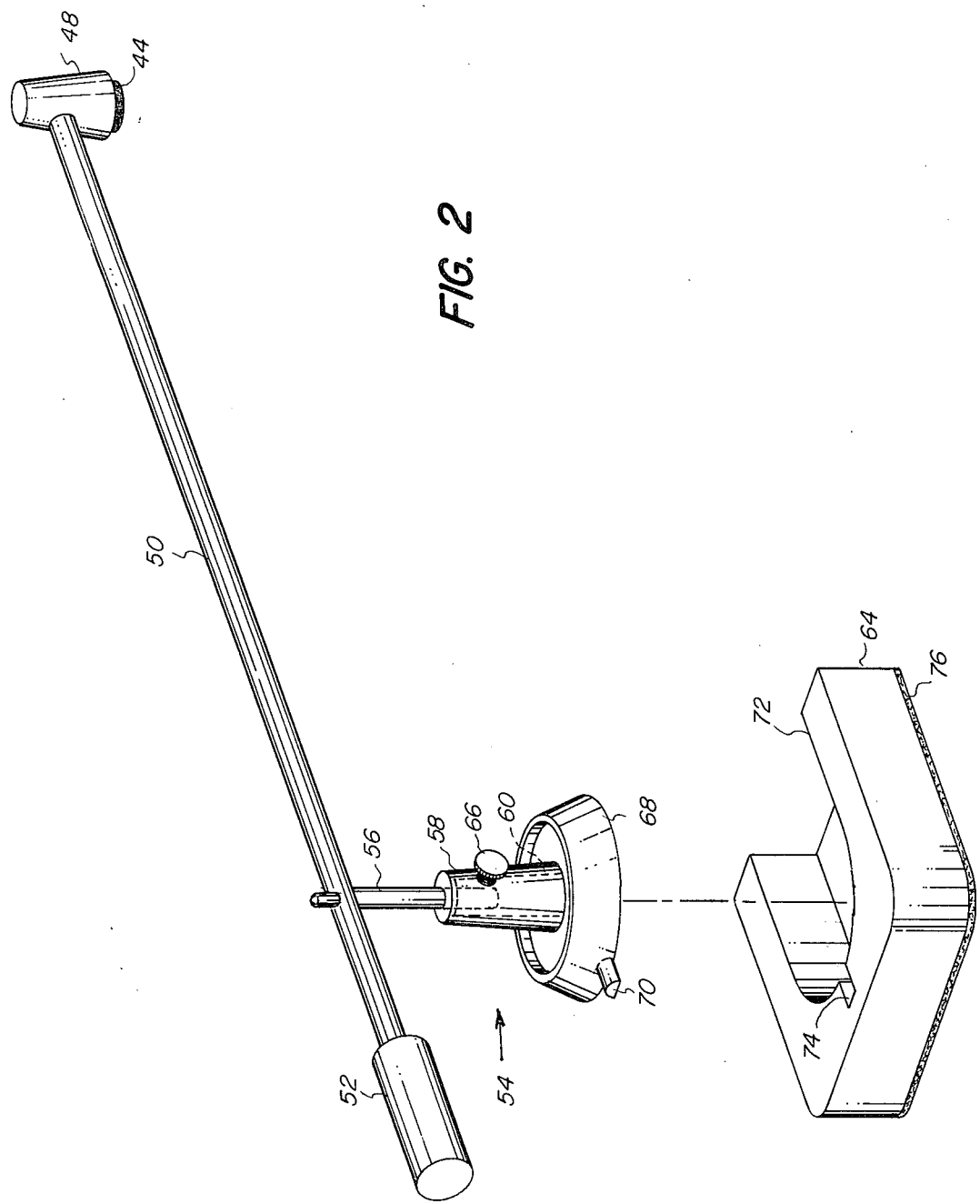
FIG. 2 is a perspective view of the boom arm and its support base.

As best seen in FIG. 2, the magnet 44 is cylindrical in shape and adhesively secured to the lower surface of a frustroconical shaped member 48 mounted on one end of a boom arm 50. A counterweight 52 is mounted on the opposite end of the boom arm 50. The boom arm 50 is mounted at a position forwardly of the counterweight 52 to a mounting assembly 54. Mounting assembly 54 consists of a post 56 having one end pivotally secured to the boom arm 50 and its opposite end secured to a housing 58 having a hollow central base 60 that is adapted to slidably receive the post 56. Housing 58 is provided with setscrew 66 which in cooperation with the base 60 and post 56 provide a means for adjusting the height of the magnet 44 from a record 32. The housing 58 is also provided with a cylindrical base member 68 having a spline 70 extending radially outward therefrom. As shown in FIGS. 1 and 2, the base member 68 and spline 70 are received in a U-shaped cut-out portion 72 and slot 74, respectively, in the mounting base 64 to insure proper placement of the boom arm 50 and magnet 44 over the end of the sound groove 36. The mounting base 64 is secured to the mounting board 14 by means of an adhesive layer although other means such as screws, a suction cup, etc. can be used if desired. Advantageously, the boom arm 50, mounting assembly 54 and mounting base 64 are all made of plastic or other inexpensively manufactured material.

Figure 3:
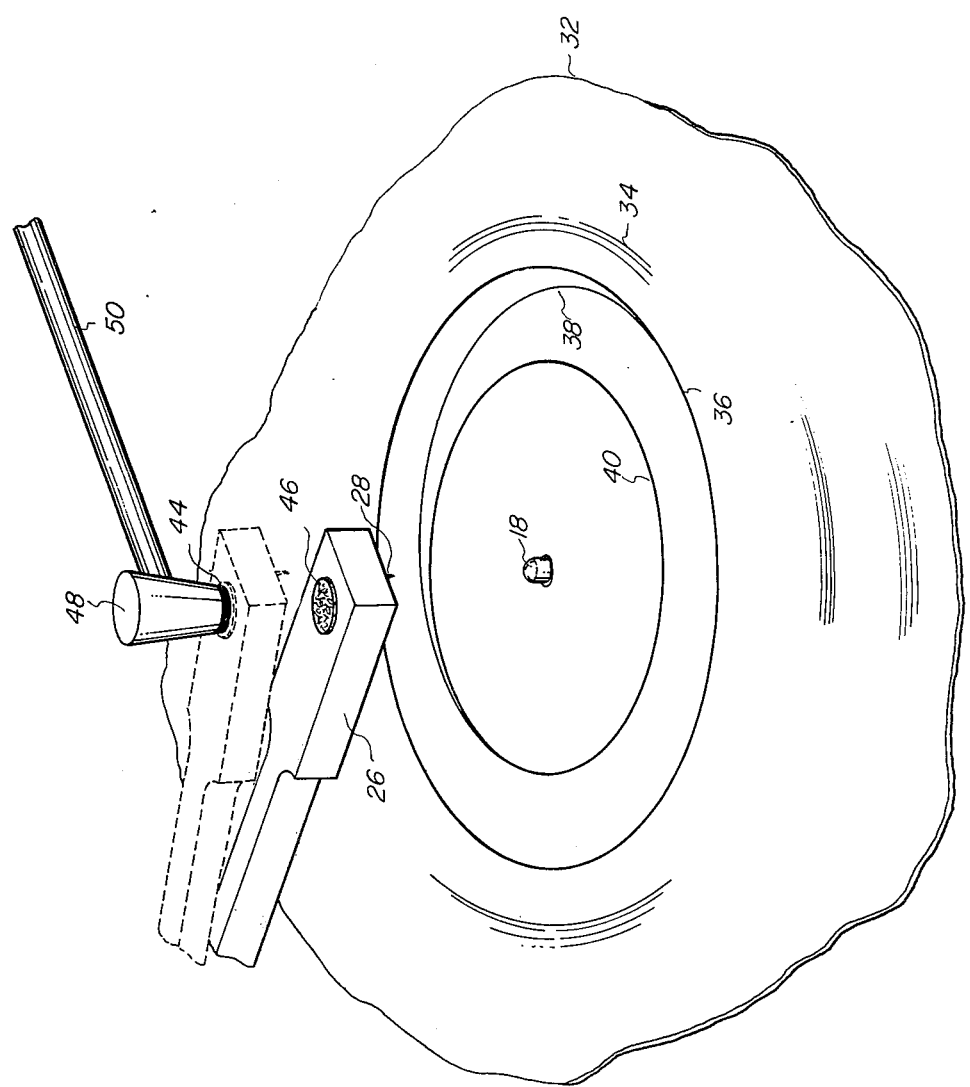
FIG. 3 is a perspective view illustrating the manner in which the stylus is lifted from a record.

The metal disk 46 mounted on the upper surface of the tone arm shell 26 is thin, magnetically attractive and of smaller diameter than the magnet 44 so that essentially no horizontal drag or excessive weight is exerted on the tone arm 20 while the stylus 28 is in the sound groove 34. As shown in FIG. 3, the boom arm 50 and magnet 44 are positioned so that after stylus 28 has passed the end 36 of the sound groove and is in the run-out groove 38, but before the stylus has entered the final circular groove 40, the disk 46 is in the portion of the magnetic field produced by the magnet 44 where a substantially upward force is exerted on the disk 46 thereby lifting the stylus off of the record 32 (i.e. to the position shown in the dash lines of FIG. 3).

Figure 4:
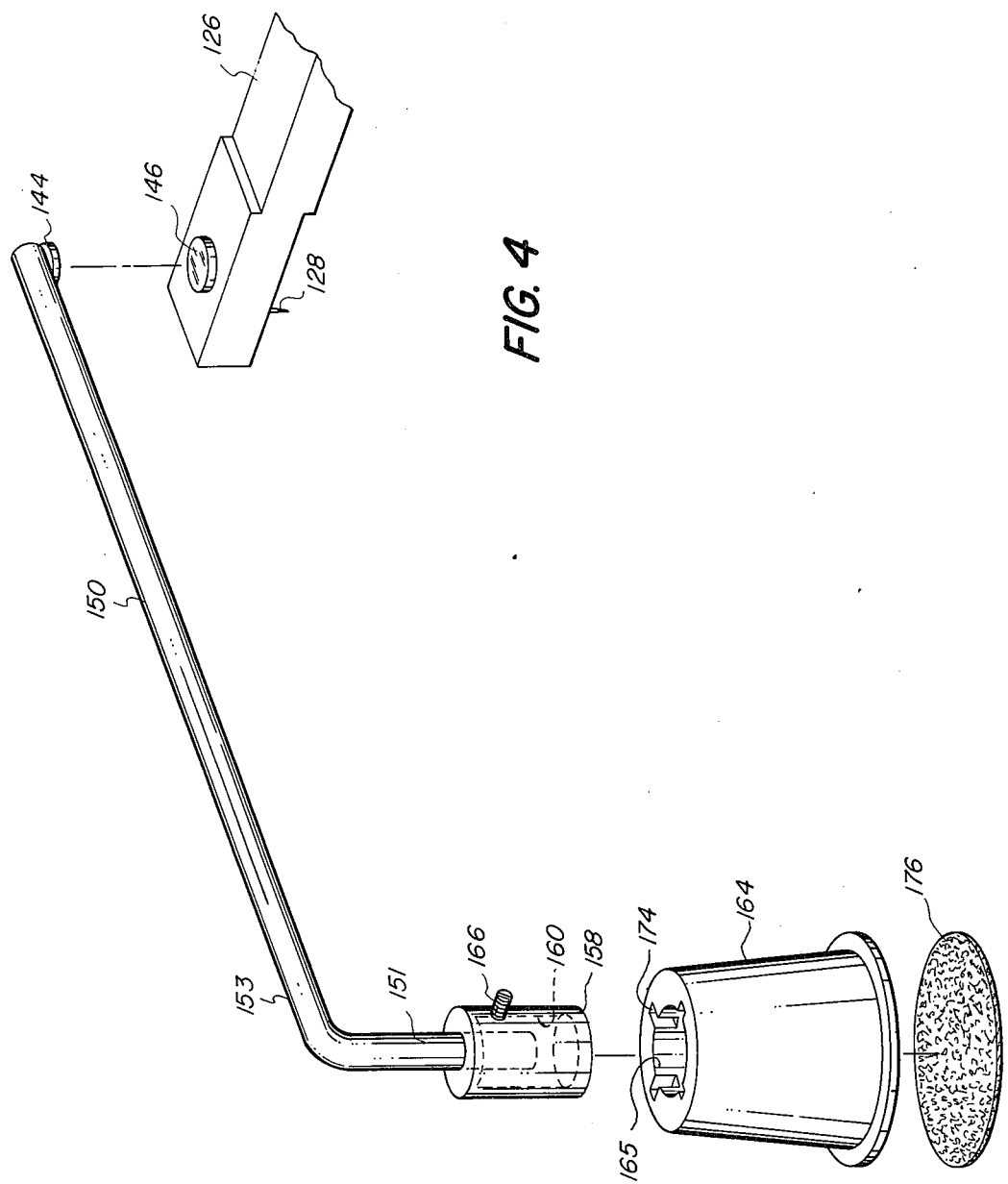
FIG. 4 is a perspective view of another embodiment of the invention.

Another embodiment of the present invention is shown in FIG. 4. In this embodiment, the boom arm 150 is goose-necked in shape. The portion 151 of the boom arm to the rear of the goose-neck 153 is inserted into a cylindrical housing 158 having a hollow central base 160. Adjustment of a setscrew 166 determines the length of the portion 151 of the boom arm 150 which is inserted into the housing 158 and thereby determines the height of the magnet 144 from the disk 146 mounted on the tone arm cartridge receiving shell 126. The mounting base 164 is provided with a cylindrical base 165 having four key slots 174 on the outer periphery thereof. The key slots 174, which are 90° apart, are adapted to receive the setscrew 166, thereby locking the boom arm 150 in one of the four predetermined positions. As in the previous embodiment, the base 164 is secured to the mounting board 14 of the phonograph 10 by means of an adhesive layer 176 or other equivalent means.

From the foregoing description, it can be seen that the present invention is a reliable, automatic stylus lifting device for high fidelity phonographic equipment that can be readily assembled for inexpensive off-the-shelf items.

The invention has been described in detail with particular reference to certain preferred embodiments thereof, but it will be understood that variations and modifications can be effected within the spirit and scope of the invention.

I claim:

1. A lifting apparatus for use with a phonograph having a tone arm provided with a stylus adapted to engage the sound groove in a record, said apparatus comprising:
    (a) a base member having a central cut-out portion including at least one key slot;
    (b) means for mounting said base member on said phonograph adjacent said record;
    (c) a boom arm having a member slidably mounted in said central cut-out portion so that one end of said arm extends inwardly of said phonograph to a position above the run-out groove of said record;
    (d) a magnet carried on said end of said arm; and
    (e) a magnetically attractive member mounted on said tone arm facing said magnet, said magnet exerting a force on said magnetically attractive member which lifts said tone arm after said stylus has moved past the end of the sound groove of said record.

2. The apparatus of claim 1 further including means for vertically adjusting the mounting position of said boom arm in said base member.

3. The apparatus of claim 1 wherein said magnetically attractive member is smaller in diameter than said magnet.

* * * * *